United States Patent
Chuah et al.

(10) Patent No.: US 7,249,139 B2
(45) Date of Patent: Jul. 24, 2007

(54) SECURE VIRTUAL MARKETPLACE FOR VIRTUAL OBJECTS AND SERVICES

(75) Inventors: Mei Chuah, Palo Alto, CA (US); Lucian P. Hughes, Montara, CA (US)

(73) Assignee: Accenture Global Services GmbH (CH)

( * ) Notice: Subject to any disclaimer, the term of this patent is extended or adjusted under 35 U.S.C. 154(b) by 631 days.

(21) Appl. No.: 10/139,064

(22) Filed: May 2, 2002

(65) Prior Publication Data

US 2003/0014423 A1 Jan. 16, 2003

Related U.S. Application Data

(60) Provisional application No. 60/305,548, filed on Jul. 13, 2001, now abandoned.

(51) Int. Cl.
G06F 17/30 (2006.01)
G06F 15/16 (2006.01)

(52) U.S. Cl. .............. 707/102; 707/104.1; 709/208

(58) Field of Classification Search .............. 707/1, 707/9, 10, 102, 104.1; 709/208, 221; 705/1, 705/74; 713/193, 200
See application file for complete search history.

(56) References Cited

U.S. PATENT DOCUMENTS

| | | |
|---|---|---|
| 5,508,731 A | 4/1996 | Kohorn |
| 5,794,221 A | 8/1998 | Egendorf |
| 5,802,296 A | 9/1998 | Morse et al. |
| 5,848,415 A | 12/1998 | Guck |
| 5,940,504 A | 8/1999 | Griswold |
| 6,026,388 A | 2/2000 | Liddy et al. |
| 6,029,145 A | 2/2000 | Barritz et al. |
| 6,041,316 A | 3/2000 | Allen |
| 6,084,865 A | 7/2000 | Dent |

(Continued)

FOREIGN PATENT DOCUMENTS

| | | |
|---|---|---|
| EP | 1041823 | 10/2000 |
| GB | 2 260 007 | 3/1993 |
| WO | WO96/27155 | 9/1996 |
| WO | WO99/31610 | 6/1999 |

(Continued)

OTHER PUBLICATIONS

Foster, C., "Content Management: Defining Requirements for Competitive Advantage," Mar. 1999, Jupiter Strategic Planning Services/SOS99-21, pp. 1-22.

(Continued)

*Primary Examiner*—Jeffrey Gaffin
*Assistant Examiner*—Hassan Mahmoudi
(74) *Attorney, Agent, or Firm*—Fish & Richardson P.C.

(57) ABSTRACT

Methods and apparatus implementing a technique for providing a secured virtual marketplace. In general, in one aspect, the technique includes maintaining a list of virtual objects as well as data format information for each of a plurality of virtual environment systems. Each virtual object is represented by data. The data format information for a virtual environment system specifies a format that data must have to be processable by the virtual environment system. The techniques includes receiving a request to distribute one or more virtual objects from the list of virtual objects, the request identifying the virtual objects to be distributed and the virtual environment system with which the virtual objects are to interact. The technique includes formatting, in accordance with the data format information and the request, data representing the one or more virtual objects to be distributed and further includes distributing the one or more virtual objects.

39 Claims, 8 Drawing Sheets

U.S. PATENT DOCUMENTS

| | | | |
|---|---|---|---|
| 6,112,181 | A | 8/2000 | Shear et al. |
| 6,119,229 | A * | 9/2000 | Martinez et al. ............ 713/200 |
| 6,135,646 | A | 10/2000 | Kahn et al. |
| 6,161,107 | A | 12/2000 | Stern |
| 6,189,008 | B1 | 2/2001 | Easty et al. |
| 6,202,056 | B1 | 3/2001 | Nuttall |
| 6,219,788 | B1 | 4/2001 | Flavin et al. |
| 6,226,618 | B1 | 5/2001 | Downs et al. |
| 6,229,533 | B1 | 5/2001 | Farmer et al. |
| 6,236,994 | B1 | 5/2001 | Swartz et al. |
| 6,263,313 | B1 | 7/2001 | Milsted et al. |
| 6,345,256 | B1 | 2/2002 | Milsted et al. |
| 6,356,903 | B1 | 3/2002 | Baxter et al. |
| 6,418,467 | B1 | 7/2002 | Schweitzer et al. |
| 6,502,131 | B1 | 12/2002 | Vaid et al. |
| 6,839,680 | B1 | 1/2005 | Liu et al. |
| 6,842,782 | B1 | 1/2005 | Malik et al. |
| 6,854,009 | B1 | 2/2005 | Hughes |
| 6,857,020 | B1 | 2/2005 | Chaar et al. |
| 6,898,618 | B1 | 5/2005 | Slaughter et al. |
| 6,904,449 | B1 | 6/2005 | Quinones |
| 6,917,979 | B1 | 7/2005 | Dutra et al. |
| 2001/0037316 | A1* | 11/2001 | Shiloh ........................ 705/74 |
| 2001/0049632 | A1 | 12/2001 | Rigole |
| 2002/0055912 | A1 | 5/2002 | Buck |
| 2002/0077988 | A1 | 6/2002 | Sasaki et al. |
| 2002/0107809 | A1 | 8/2002 | Biddle et al. |
| 2002/0143819 | A1 | 10/2002 | Han et al. |
| 2002/0143920 | A1 | 10/2002 | Dev et al. |
| 2002/0152297 | A1 | 10/2002 | Lebourg et al. |
| 2003/0004844 | A1 | 1/2003 | Huelex |
| 2003/0023564 | A1 | 1/2003 | Padhye et al. |
| 2003/0053448 | A1 | 3/2003 | Craig et al. |
| 2003/0225696 | A1 | 12/2003 | Niwa |
| 2004/0039704 | A1 | 2/2004 | Gilliam et al. |
| 2004/0064471 | A1 | 4/2004 | Brown et al. |
| 2005/0171984 | A1 | 8/2005 | Papalardo et al. |

FOREIGN PATENT DOCUMENTS

| | | |
|---|---|---|
| WO | WO00/42555 | 7/2000 |
| WO | WO 01/11511 | 2/2001 |
| WO | WO01/28141 | 4/2001 |
| WO | WO01/44907 | 6/2001 |
| WO | WO01/69903 | 9/2001 |

OTHER PUBLICATIONS

Kirzner, R., "Managing Content: The Key to Success in Web Business," Jun. 1999, *International Data Corporation*, pp. 1-12.

Sanborn, S., "Content management expands its role," Feb. 19, 2001, *Infoworld*, p. 38.

"Content management made strategic," Feb. 19, 2001, *Infoworld*, p. 48.

White, A. S., "Managing the Development and Delivery of Content." May 1999, *International Data Corporation*, pp. 1-15.

Knox, R., "Multichannel Output: Process Changes on Horizon," Apr. 20, 1999, Gartner Group,, Inc., 4 pp.

Ingalls, J., Lundy, J., "Where Is Output Headed? Ten Key Trends," Jan. 12, 1999, Gartner Group, Inc., 5 pp.

Seeley, C., Dietrick, B., "Crafting A Knowledge Management Strategy, Part two. Marrying content with IT applications," *Knowledge Management Review*, Issue 12 Jan./Feb. 2000, pp. 20-23.

Berg, T., Drakos, N., Valdes, R., "Web-Site Deployment and Operations," Jan. 8, 1999, Gartner Group, Inc., 76 pp.

Robins, S., Mahony, C., "Web Content Management for Pervasive Content," The Yankee Group, Oct. 13, 2000 pp. 1-26.

"Open Market e-Business Suite," Oct. 13, 2000, http://www.openmarket.com/egi-..../Render&c=Collection &cid=OMI76UJ9KYB&live=tru, 2 pp.

"Knowledge Organizer: Organize your intranet content the way you organize your business," http://www.verity.com/products/ko/, Verity® Knowledge Organizer®, Product Overview, Oct. 13, 2000, Verity, Inc., 2 pp.

"ThomasTech Content Management Solutions," http://www.thomastechsolutions.com.content.htm, Oct. 13, 2000, Thomas Technology Solutions, Inc., 3 pp.

"U.K.'s second largest retailer, Great Universal Stores, purchases VALEX software to increase relevance and impact of marketing campaigns," Jun. 21, 2000, http://www.xchange.com/news/press_releases/1999/1999-07-19-02.asp, Exchange Applications, pp.

"What is eCRM?," http://www.xchange.com/resource/default.asp, Jun. 21, 2000, Exchange Applications, 1 p.

"Step 1: Identify your most profitable customers," http://www.xchange.com/resource/step1.asp, Jun. 21, 2000, Exchange Applications, 1 p.

"Step 2: Personalize your marketing efforts through technology," http://www.xchange.com/resource/step.asp, Jun. 21, 2000, Exchange Applications, 1 p.

"Step 3: Evaluate the results of your strategies," http://www.xchange.com/resource/step3.asp, Jun. 21, 2000, Exchange Applications, 1 p.

"Glossary," http://www.xchange.com/resource/gloassary.asp, Jun. 21, 2000, Exchange Applications, 5 pp.

Whitepaper Request, "Evolving to eCRM: How to optimize interactive relationships between you and your customers," http://www.xchange.com/resource/whitepaper.asp, Jun. 21, 2000, Exchange Applications, 1 p.

"V/5 Ebusiness Platform Architecture," http://www.vignette.com.CDA/Site/0,2097,1-1-731-1191-733-1196,FF.html, Jun. 21, 2000, Vignette Corporation, 4 pp.

Vignette Application Power Pack™, Jun. 21, 2000, Vignette, 2 pp.

"IMRglobal," http://www.ca.imrglobal.com/contact.htm, Jun. 21, 2000, 2 pp.

"4i Content Management," http://www.documentum.com/products/content/index.html, Jun. 21, 2000, Documentum, Inc., 2 pp.

"Documentum 4i eBusiness Edition starts with:," http://www.documentum.com/products/content/internet-4i/doc4i.html, Jun. 21, 2000, Documentum, Inc., 2 pp.

"Documentum eDeploy™," http://www.documentum.com/products/content/internet-4i/edeploy.html, Jun. 21, 2000, Documentum, Inc., 1 p.

"Documentum eConnectors™," http://www.documentum.com/products/content/internet-4i/econnectors.html, Jun. 21, 2000, Documentum, Inc., 2 pp.

"Documentum 4i Integrators," http://www.documentum.com/products/content/internet-4i/integrators.html, Jun. 21, 2000 Documentum, Inc., 1 p.

"Documentum FrameLink Product Suite," http://www.documentum.com/products/content/internet-4i/framework.html, Jun. 21, 2000, Documentum, Inc., 1 p.

Documentum e-Business Development Tools,: http://www.documentum.com/products/content/internet-4i/devstudio.html, Jun. 21, 2000, Documentum, Inc., 2 pp.

Black Pearl—Main Body, http://blackpearl.com/solutions/solutions_body.html, Jun. 21, 2000, Black Pearl, Inc. 3 pp.

Black Pearl—Main Body, http://www.blackpearl.com/company/company_body.html, Jun. 21, 2000, Black Pearl, Inc. 2 pp.

"Making Clicks and Motor Click™: Extending relationship business' expertise into e-markets.," 2000, Black Pearl, Inc., 2 pp.

"About Documentum," http://www.documentum.com/company/about/ index.html, Jun. 21, 2000. Documentum, Inc.,.

Web Content Management Strategies, Technologies and Markets, 2000, Ovum Ltd., pp. 1-230.

European Search Report, EP Application Serial No. EP 02 25 4929, Dec. 20, 2004, pp. 1-2.

Jee et al., "A DAVIC Video-on-Demand System Based on the RTSP", *IEEE Comput. Soc*, pp. 231-238, (2001).

* cited by examiner

SECURE VIRTUAL MARKETPLACE FOR VIRTUAL OBJECTS AND SERVICES

CROSS-REFERENCE TO RELATED APPLICATIONS

This application claims benefit of U.S. Provisional Application No. 60/305,548, filed Jul. 13, 2001, which is incorporated herein by reference in its entirety.

BACKGROUND OF THE INVENTION

The present invention relates to virtual objects and services.

Online virtual environments provide a medium in which real world users ("users") can interact with each other. These virtual environments include but are not limited to: chat rooms; instant messaging communities; and virtual worlds, which in turn can include social worlds such as lambda MUCK, online gaming environments such as Sierra online and EA online, and massive, multiplayer fantasy worlds such as Everquest, Ultima Online, and Asheron's Call.

Virtual environments share some common properties. First, all users participate in a shared context. That is, users typically experience a common environment. For example, two users in a virtual room will experience the same virtual room, including seeing the same room appearance and hearing the same noises in the room.

Furthermore, in some virtual environments, such as a virtual world, users are represented by virtual characters, which will be referred to as avatars. Avatars can be represented textually or visually, depending on the virtual world. For example, in a virtual world where real world players interact through text messages, an avatar can be a simple textual handle such as Bob or Mary. In contrast, in a virtual world that is graphical in context, an avatar can be represented in graphical form. Avatars may be human in appearance but need not be so. In fact, an avatar may take on any shape or form, may perform any action, and may speak in any voice or language, subject to the constraints of the online virtual world in which they reside.

In addition to having avatars, some virtual environments such as a virtual world, can also contain a rich set of virtual objects. In general, a virtual object is defined by its function and form. The functional component of a virtual object describes its functional properties such as whether it is a container, whether it can be worn, where it can be worn, how heavy it is, and what special powers it has. In contrast, the form component of a virtual object describes the look, feel, and sound of the good. Virtual objects can have some function within their virtual world, can be solely used for decorative purposes, or can be both decorative and functional. The virtual avatar, is at its base a virtual object. It has a function, as well as form. An avatar is a special type of virtual object, however, in that it represents a user and is controlled by the user.

The form of most avatars and virtual objects are determined by choosing from a fixed number of appearance options during an avatar or virtual-object creation phase. Often a separate avatar creation phase must be completed for each virtual world, and characters and virtual objects can rarely be transferred across different virtual worlds. Even if they are transferable, the transferred avatar or virtual object exists out of context. For example, the transferred avatar may be a caveman who would be completely out of context in a futuristic virtual world.

Avatars and virtual objects may be customized to a limited extent, the extent depending on the virtual world to which they belong. In some virtual worlds like the SIMs (Electronic Arts) and Unreal Tournament (GT interactive), avatar and virtual object formats are open. That is, users have access to and can modify the form and function of their respective avatars and virtual objects. Accordingly, customization is possible in terms of both function and form. These virtual worlds will be referred to as open worlds. In other virtual worlds like Everquest (Sony), Asheron's Call (Microsoft), and Ultima Online (Electronic Arts), the formats are closed and unavailable to users. In these cases, customization is limited to the rules established by owners of the virtual worlds. These virtual worlds will be referred to as closed worlds.

Virtual objects are being traded in both open and closed worlds. In closed worlds, users must typically put up virtual objects for bidding on a Web site, such as Ebay®, in the real world. Once the bidding commences, and the transfer of real world money is complete, the participating users must arrange to have their respective avatars meet in the relevant virtual world and exchange the relevant virtual objects.

There are some problems with exchanging virtual objects in this fashion. Such exchanges are cumbersome. Users must manually transfer the virtual objects themselves, even though the goods are fully digital in nature. Furthermore, the transfer of goods within the virtual world is unsafe. No security is in place to keep the selling avatar from reacquiring the virtual objects from the buying avatar after the transfer of virtual objects has occurred. For example, nothing prevents the selling avatar from stealing from or killing the buying avatar. Another problem is that the supply of virtual objects are not controlled. Specifically, virtual objects are sold in an ad-hoc manner and their supply is essentially uncontrolled. This lack of control leads to inflationary conditions within the virtual worlds and unstable goods prices within the marketplace. As a result of this uncertainty, the number of trades that occur are limited.

In open worlds such as Unreal, Quake, and the SIMs, users exchange virtual objects through repositories. These repositories accept free virtual object contributions from users, and, in return, make the contributed goods available for free to everyone.

There are some problems with exchanging virtual objects in this fashion. There is little incentive to create high quality virtual objects because there are no monetary rewards for doing so. There is also no control on quality. Because such repositories are free and often managed for free by users, the quality among virtual objects may differ significantly. As a result, it can sometimes be difficult to procure or find high quality virtual objects even if one is willing to pay for it. In addition, little support is given in terms of search and browse functionalities. Furthermore, there are no built-in controls to ensure that the virtual objects actually follow the artistic and functional themes of the virtual environments in which they reside. This break down in themes ultimately may result in a chaotic world, with no consistent world rules to preserve a common context among its users. Such chaos will degrade the experience for users of all virtual environments.

In summary, even though virtual objects are currently traded, most of these trades are limited, insecure, and unmanaged. As a result, the virtual objects available for trading are limited in both quality and range, difficult to find, limited in scope of use, and often unsupported.

SUMMARY OF THE INVENTION

The present invention provides method and apparatus, including computer program products, for providing a secure virtual marketplace for virtual objects and services.

In general, in one aspect, the present invention provides a method for distributing virtual objects. The method includes maintaining a list of virtual objects, each virtual object being represented by data. The method includes maintaining data format information for each of a plurality of virtual environment systems, the data format information for a virtual environment system specifying a format that data must have to be processable by the virtual environment system. The method includes receiving a request to distribute one or more virtual objects from the list of virtual objects, the request identifying the virtual objects to be distributed and the virtual environment system with which the virtual objects are to interact. The method includes formatting, in accordance with the data format information and the request, data representing the one or more virtual objects to be distributed. The method includes distributing the one or more virtual objects.

The invention can be implemented to realize one or more of the following advantages. The form of a virtual object can change to be consistent with the theme of a virtual environment into which the virtual object is transferred. Consequently, the virtual object can be distributed into any one of the multiple disconnected virtual environments without disrupting the theme of any of the virtual environment. The form of one virtual object can be attached to the function of another. A secure virtual marketplace is provided where virtual objects may be securely traded and transferred to the relevant avatars and virtual environments. The marketplace facilitates the instantaneous and automatic transfer of virtual objects so that users do not have to manually exchange virtual objects. Trademarks and brands can be displayed on any virtual object and, furthermore, are protected against counterfeiting and will generally be displayed after the virtual object has been properly authenticated. Users can request, from within a virtual world, ownership information of virtual objects. A real world object can be associated with a corresponding virtual world object. This capability allows companies to promote their goods with virtual instead of real world merchandise, to enhance the value of their real world goods by attaching them to virtual objects, and to enhance the value of their virtual objects by attaching them to real world objects. The supply of virtual objects can be controlled based, in part, on tracking and profiling information. A system for charging for such services is also provided. The system can, e.g., perform digital-rights settlement such that owners of intellectual property included in a virtual object are paid when the virtual object is involved in a transaction.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
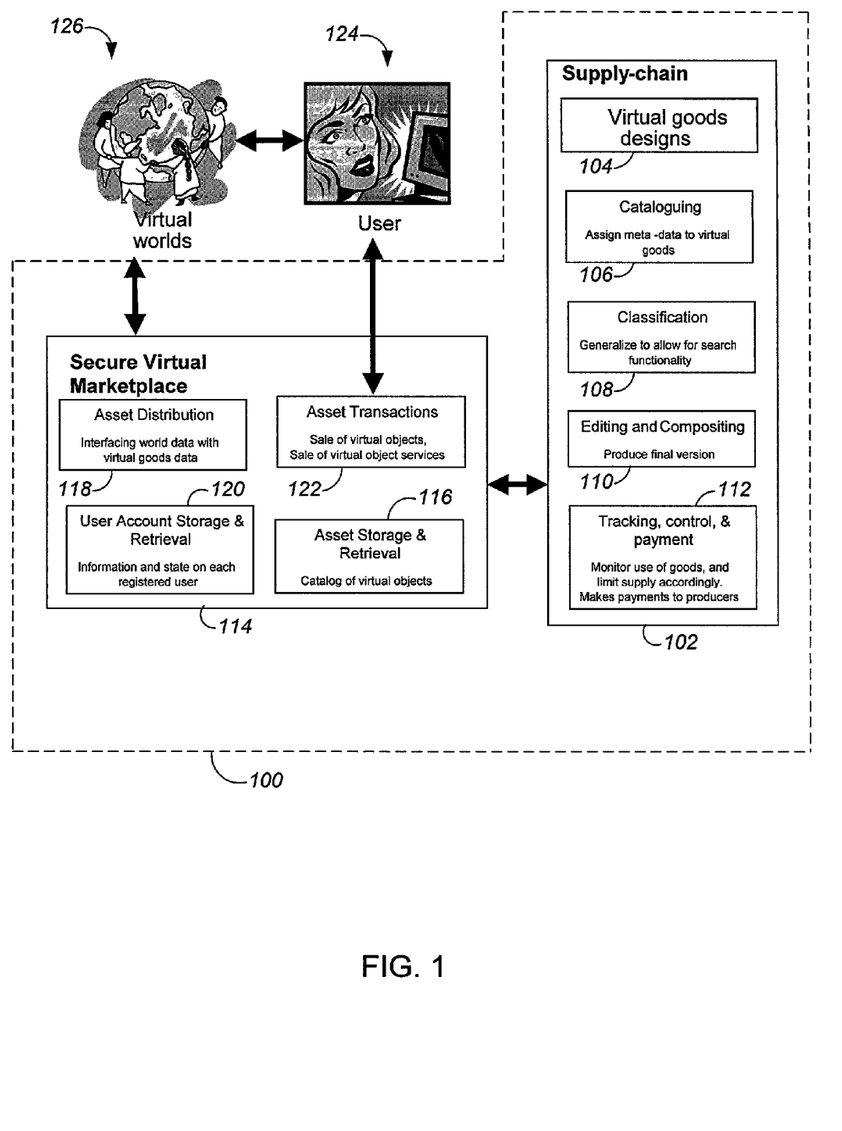
FIG. 1 shows a system for providing a secure virtual marketplace in accordance with the invention.

FIG. 1 shows a system 100 in accordance with the invention for providing a secure virtual marketplace. Supply chain 102 includes system 104 for receiving and storing the initial virtual object prototypes or designs that are created by producers. The initial virtual object designs have a common object format. Alternatively, initial object designs can have different formats, in which case the initial format is converted into one recognized byte system 100. Cataloging system 106 enhances the virtual designs by assigning relevant meta-data to each virtual object design. Classification system 108 properly classifies each virtual object design to enable effective searching and browsing of the supply of virtual objects. Editing and compositing system 110 combines the virtual object design with other content such as advertisements or additional object information and, thereby, produces the final version of the virtual object. System 100 transfers the virtual objects into secure virtual marketplace 114. Tracking, Control, and Payment system 112 tracks the number of virtual objects in circulation and the demand for such virtual objects and, furthermore, controls the supply of virtual objects to attain the highest profits from virtual object sales. System 100 uses a demand-supply model to calculate supply and price needed to maximize profits. Alternatively, any other feasible economic model can be used. Tracking, Control, and Payment system 112 includes settlement information for paying owners and entities who own intellectual property rights included in virtual objects being transacted. These owners and entities include, e.g., people who submitted designs for virtual objects. In one implementation, the system 100 makes payments (i.e., settle) on a per transaction basis. Alternatively, the system can keep an record of the transaction and periodically make payments (i.e., settle) on a batch basis.

Secure virtual marketplace 114 includes an Asset Storage And Retrieval system 116 which maintains a list ("virtual object list" or "list of virtual objects") that includes virtual objects and their corresponding information. Note that maintaining a list is not limited to storing the list in machine readable memory but can also include other actions such as updating the list. The information includes unique identification numbers for each virtual object and the total number of each virtual object that is available for sale. Note that the identification numbers need not be unique if there is no need to track the virtual objects (tracking is discussed below). Note also that the identifier need not be numbers but can be any type of data, such as characters and symbols. Asset Distributing system 118 interfaces real world data with virtual objects. User Account Storage and Retrieval system 120 maintains information and status for each user registered to use secure virtual marketplace 114. Asset Transaction system 122 conducts the sales of virtual objects and their associated services, which are further described below. Users such as user 124 interacts with secure virtual marketplace 114 to conduct transactions involving virtual objects. These transactions include browsing and searching for products, as well as securely purchasing virtual objects and services. Secure virtual marketplace 114 distributes virtual objects to their respective owners, such as user 124.

Virtual environments, such as virtual worlds 126, are where the virtual objects finally reside and are consumed. Typically, virtual worlds are generated from software residing on servers connected to networks such as the Internet. These servers will be referred to as virtual world servers. Once a virtual object is purchased in the secure virtual marketplace, it will be distributed to the relevant worlds, so that it is available to the user upon entry to those world(s). Optionally, system 100 distributes virtual objects directly to a user. This option supports users using a peer-to-peer network to interact in a virtual world.

System 100 provides methods and apparatus that facilitate virtual object transactions. These methods and apparatus are described below.

Distributing Virtual Objects into Multiple Virtual Worlds

Currently virtual objects only exist within the localized context of single virtual worlds. As discussed, a virtual object that exists within a given world cannot commonly be transferred into another. Secure virtual marketplace 114 introduces the concept of a global virtual object that can be easily and seamlessly used in many different, disconnected, localized virtual worlds. All the global virtual objects reside in databases that live outside of the virtual worlds.

Figure 2:
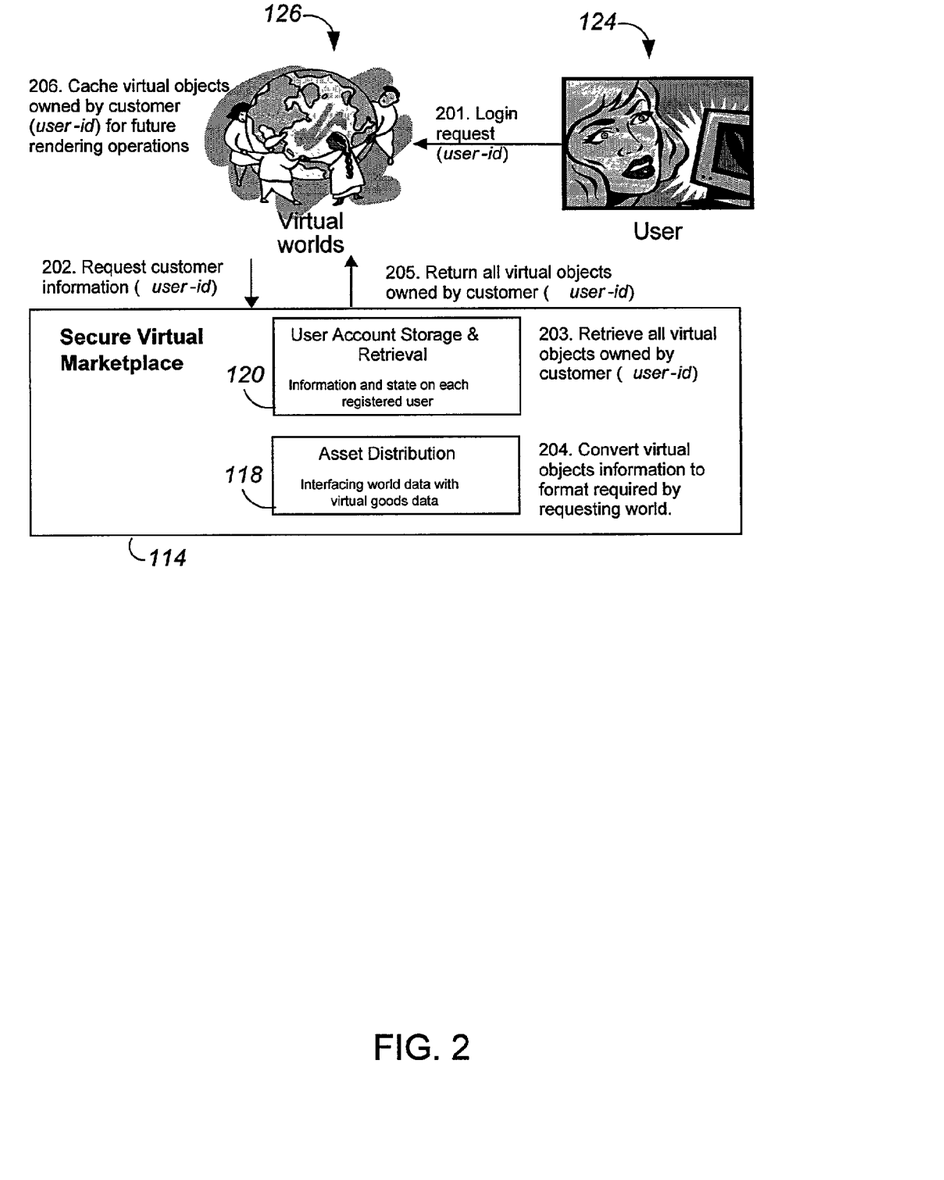
FIG. 2 shows a method for distributing virtual objects into multiple disconnected virtual worlds in accordance with the invention.

In one implementation, the virtual objects are distributed to each of the relevant virtual worlds during player login and logout. FIG. 2 shows the operations between virtual worlds 126 with respect to secure virtual marketplace 114 that contains both user ownership information as well as the virtual object list. User 124 logs into one of the virtual worlds 126 (step 201). The virtual world sends a request to secure virtual marketplace 114 to distribute virtual objects belonging to user 124 (step 202). The requested virtual objects can be global virtual objects, local virtual objects, or a combination of global and local virtual objects. The request includes information about user 124. Secure virtual marketplace receives the request and retrieves all virtual objects owned by user 124 (step 203). Secure virtual marketplace 114 converts the virtual objects into a data format that the virtual world system can recognize (step 204) and distributes the virtual objects to the requesting virtual world for further distribution to the avatar controlled by user 124 (step 205).

Alternatively, the virtual objects are updated, periodically sent to the virtual worlds 126, and cached within the virtual world machines (not shown). Content rich information attached to the virtual objects such as bitmaps, meshes, sound, and animation, are updated and cached within the virtual world machines periodically, rather than upon each user login. In this case, the secure virtual marketplace 114 need not send the virtual object itself but only information, such as information about the user 124, that allows the virtual worlds 126 to retrieve the virtual objects of the user 124 from its cache and distribute these virtual objects to the user 124.

Optionally, secure virtual marketplace 114 converts a global virtual object into a form that is consistent with the theme of the virtual world into which the virtual object is being distributed. To do this, secure virtual marketplace 114 stores form information for each global virtual object to specify the form of the virtual object in each of the multiple virtual worlds 126. System 100 supports local virtual objects, i.e., those that exists only within the local context of their respective virtual world. System 100 stores information, such as form and data format, for the corresponding virtual world of a local virtual object. When the local virtual object is needed, system 100 places the virtual object in the appropriate form and data format and distributes the virtual object. Optionally, a local virtual object is converted into a global virtual object by adding information, such as form and data format information, for additional virtual worlds.

The above operations allow any of the multiple virtual worlds 126 to communicate with secure virtual marketplace 114 to retrieve user ownership information. This capability in turn allows users to retrieve their global or local virtual objects from secure virtual marketplace 114 into any of the virtual worlds 126. This capability confers added value to the virtual objects because they now have wider applicability and, furthermore, allows users to maintain a common visual persona across multiple worlds.

Note that the example description above applies to both a client-server as well as peer-to-peer architecture within the virtual worlds. In the client-server case, secure virtual marketplace 114 communicates with the virtual world server, and in the peer-to-peer case, secure virtual marketplace 114 communicates with each of the separate client machines.

Attaching Virtual Objects Together

As discussed, a virtual object has both form and function. Secure virtual marketplace 114 allows a user to securely attach the form of one virtual object to the function of another, subject to the constraints of the virtual objects involved. For example, certain virtual objects may only allow other objects that belong to the same parent class to be attached to it. The attach operation may also be used to attach a form of a global virtual object to the function of a local virtual object and vice versa.

Additionally, there are often virtual objects in virtual worlds that can perform certain special functions, or that may confer upon its user certain special abilities, and improved character statistics. These special properties and virtual objects are often kept locally within the world because the functions conferred only apply to a given world. For variety, or appearance consistency, however, a user may want to attach a different appearance to the local virtual objects. Secure virtual marketplace 114 allows the functions of local virtual objects to be attached to the form of a global virtual object.

Figure 3:
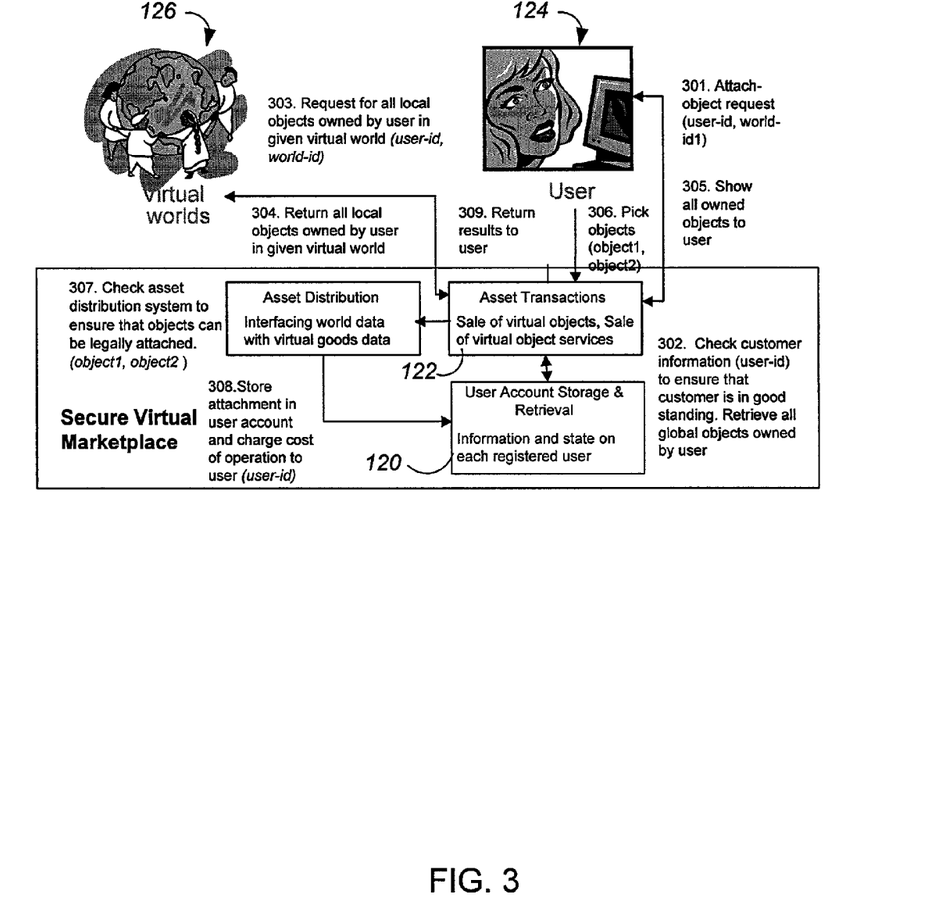
FIG. 3 shows a method for attaching a form of one virtual object to the function of another in accordance with the invention.

As shown in FIG. 3, user 124 sends an attach-object request to the Asset Transactions system 122 of secure virtual marketplace 114 (step 301). The request includes information to identify the user and the virtual world where the user owns the local virtual object. Asset Transactions system 122 checks user information to ensure that the user is in good standing and retrieves all global virtual objects owned by the user (step 302). Asset Transactions system 122 then requests all local virtual objects owned by user 124 in the virtual world in which the user is currently logged (step 303). The virtual world returns all local virtual objects owned by the user in the virtual world (step 304). Secure virtual marketplace 114 shows the retrieved local and global virtual objects to user 124 (step 305). User 114 selects objects for attaching and sends this information to secure virtual marketplace 114 (step 306). Secure virtual marketplace 114 checks its Asset Distribution System 118 to ensure that the user selected objects can be attached under the constraints of the virtual worlds (step 307), makes the attachments and stores such attachments in its User Account Storage and Retrieval system 120 (step 308), and returns the results to user 124 (step 309).

Selling Buying, Trading, and Exchanging Virtual Objects

A virtual object purchase or sale involves the transfer of funds between or among users and the transfer of virtual object(s) between or among these users. Secure virtual marketplace 114 allows users to securely purchase virtual objects, and securely sell virtual objects to secure virtual marketplace 114, as well as perform purchases and sales with other users.

Figure 4:
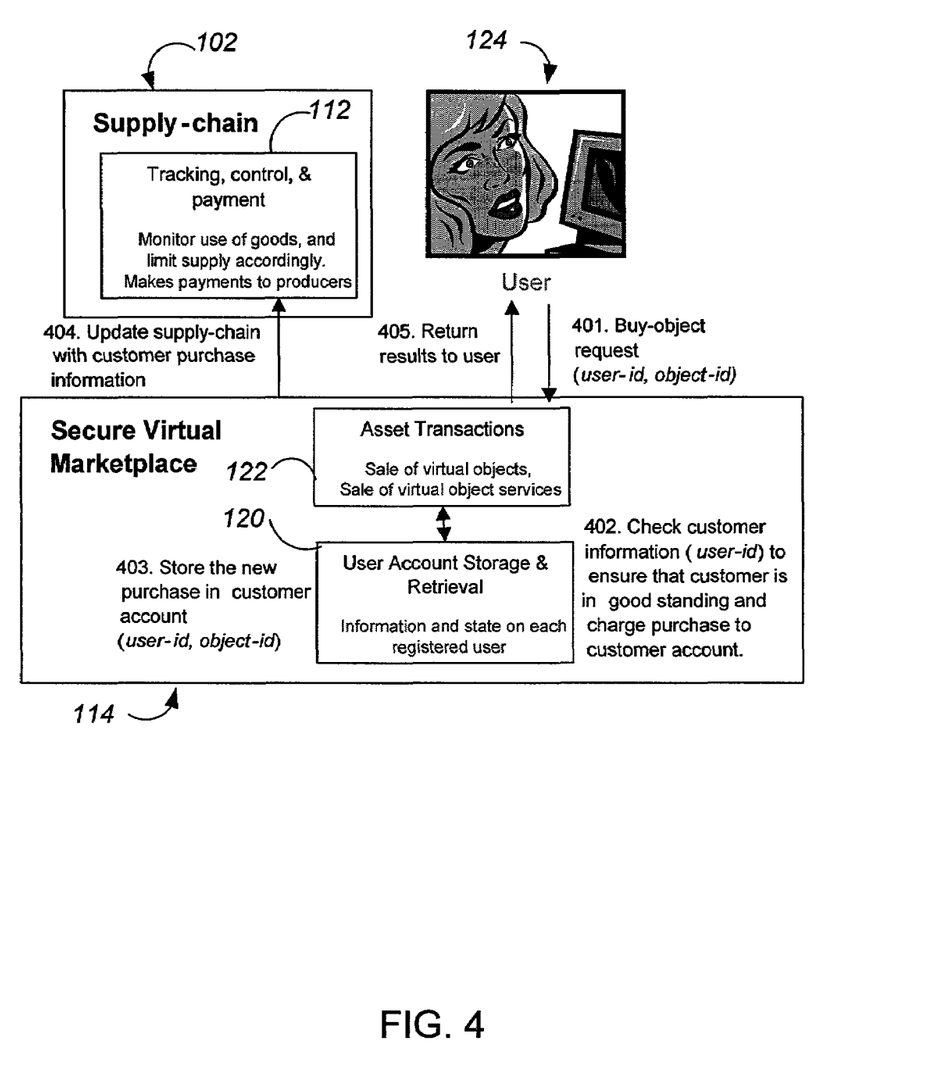
FIG. 4 shows a method for exchanging virtual objects in accordance with the invention.

As shown in FIG. 4, user 124 submits a buy-object request (step 401). The request includes information to identify the user and the virtual object the user wishes to buy. Secure virtual marketplace 114 checks the user information in its User Account Storage and Retrieval system 120 to ensure that the user is in good standing and charges the purchase to the user's account (step 402). Secure virtual marketplace 114 records the new purchase and updates the Asset Storage and Retrieval system 120 (step 403). System 100 provides Supply Chain 102 with customer purchase information (step 404) and returns the results of the transactions to user 124. Sell operations and exchange operations between users are performed in a similar manner.

Optionally, the system 100 stores authorization information for a virtual object. The authorization information specifies rules that must be satisfied before a virtual object can be sold, purchased, traded, or distributed. Requiring an avatar to meet some criteria such as reaching a certain achievement level before allowing the avatar to obtain the virtual object is one example of a rule. In one implementation, the authorization is stored in the Asset and Distribution Component 118 of system 100. Alternatively, the authorization information can be stored anywhere in the system. The authorization information can be stored as metadata.

Virtual objects may sometimes be lost, stolen, or destroyed while traveling within a virtual world. Some of these virtual objects may be attached to global goods, or may be global goods themselves that are stored within the virtual objects marketplace. When such events occur, system 100 updates User Account Storage and Retrieval 120 within secure virtual marketplace 114 with this new information. In one implementation, the tracking of virtual objects changing hands within a world is achieved on user logout.

Figure 5:
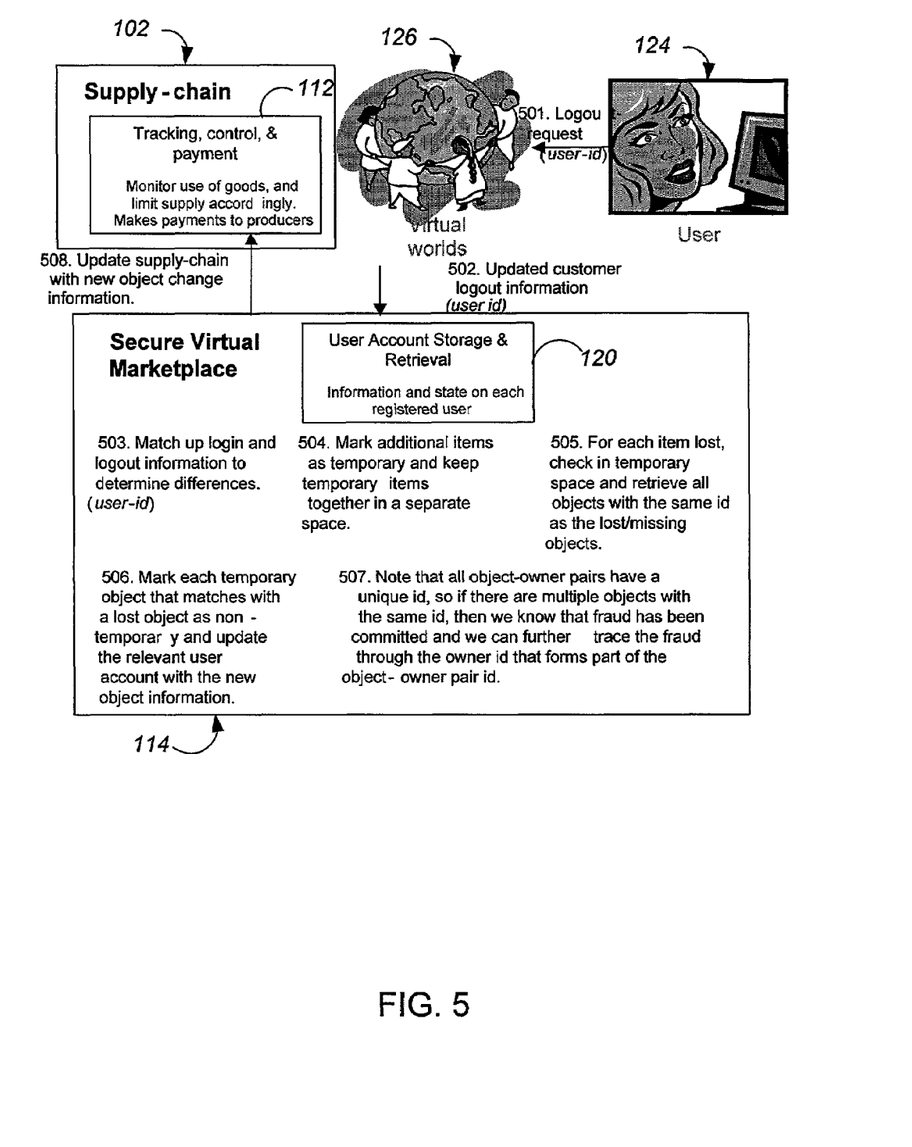
FIG. 5 shows a method for attaching trademarks and brands to virtual objects in accordance with the invention.

As shown in FIG. 5, user 124 logs out of a virtual world (step 501). The virtual world sends secure virtual marketplace 114 updated user information specifying the inventory of virtual objects in the user's possession at logout (step 502). Secure virtual marketplace 114 compares the logout inventory with an inventory taken at user 124's preceding login and determines whether virtual objects were gained or lost (step 503). Secure virtual marketplace 114 marks any additional virtual objects as temporary and keeps these temporary virtual objects together in a location (not shown) separate from the rest of the user's virtual objects (step 504). For each virtual object lost or missing, secure virtual marketplace 114 checks in the temporary location and retrieves all virtual objects with the same identification as the lost or missing virtual objects (step 505). Secure virtual marketplace 114 removes the temporary mark from each temporary virtual object that matches with a lost virtual object and updates the relevant user accounts to reflect that the lost virtual object has been found (step 506). Lost objects can be returned to their owners, depending on the policy of the virtual world. Some virtual worlds have non-transferable virtual goods, in which case lost virtual goods are returned to their owners. Some virtual worlds have transferable virtual goods, in which case lost virtual goods are not returned to their owners. All virtual object and owner pairs have a unique identification so that if there are multiple objects with the same identification, the system knows that fraud has been committed. Furthermore, system 100 traces such fraud through the owner identification that forms part of the virtual object and owner identification (step 507). Secure virtual marketplace 114 updates the supply chain with the new virtual object information (step 508).

Optionally, a virtual world server can notify system 100 in real time whenever possession of virtual objects changes inside the virtual world. In this case, system 100 can instantaneously track the ownership of virtual objects and thus need not wait until user logout to do so.

Attaching Trademarks and Brand on Virtual Objects; Updating Local Objects

System 100 also supports attaching trademark and brand information to virtual objects. Trademark and brand information are attached to the bitmaps, meshes, or image component of a virtual object when a virtual world server requests a periodic update. Whether a particular virtual object has trademark or brand information attached to it is determined within the supply-chain during the cataloguing phase. Attachment of trademark and brand information on virtual objects enhances the value of those goods similar to how trademarks branded goods in the real world have enhanced value when attached to a prestigious brand or mark. Trademark and brand information also allows various real world companies to engaged in brand advertising through the use of virtual objects within the context of virtual worlds. This is a new form of advertising as well as a new revenue source for owners of virtual worlds and owners of the virtual objects. Note that producers may need to pay for the service of attaching brand information on their virtual objects.

Optionally, the trademark and brand information includes digital rights management ("DRM") information for paying or collecting fees associated with the brand or mark such as royalties. The DRM information allows the system 100 to administer any business arrangement such as licensing and exclusive usage rights. For example, the DRM information can specify that a certain brand can only be exclusively associated with certain virtual objects. The DRM information includes information specifying the owner of the brand or mark and the amount of royalties. The DRM information can also include shelf life and usage restrictions. Shelf life refers to a period after which the brand is no longer displayed or associated with the virtual object. Usage restrictions refers to rules for displaying the brand, which rules can for example specify that a brand cannot be displayed with certain types of virtual objects. In one implementation, the system 100 stores DRM information associated with a virtual object as metadata of the virtual object. Alternatively, the DRM information can be stored in any format. Furthermore, the DRM information can be stored anywhere in the system 100, including the Asset Distribution system 118 and the Tracking, Control, and Payment system 112. Because the system 100 can track all transactions of virtual objects (through its Tracking, Control, and Payment system 112), the system 100 has the infrastructure to apply the DRM information.

Figure 6:
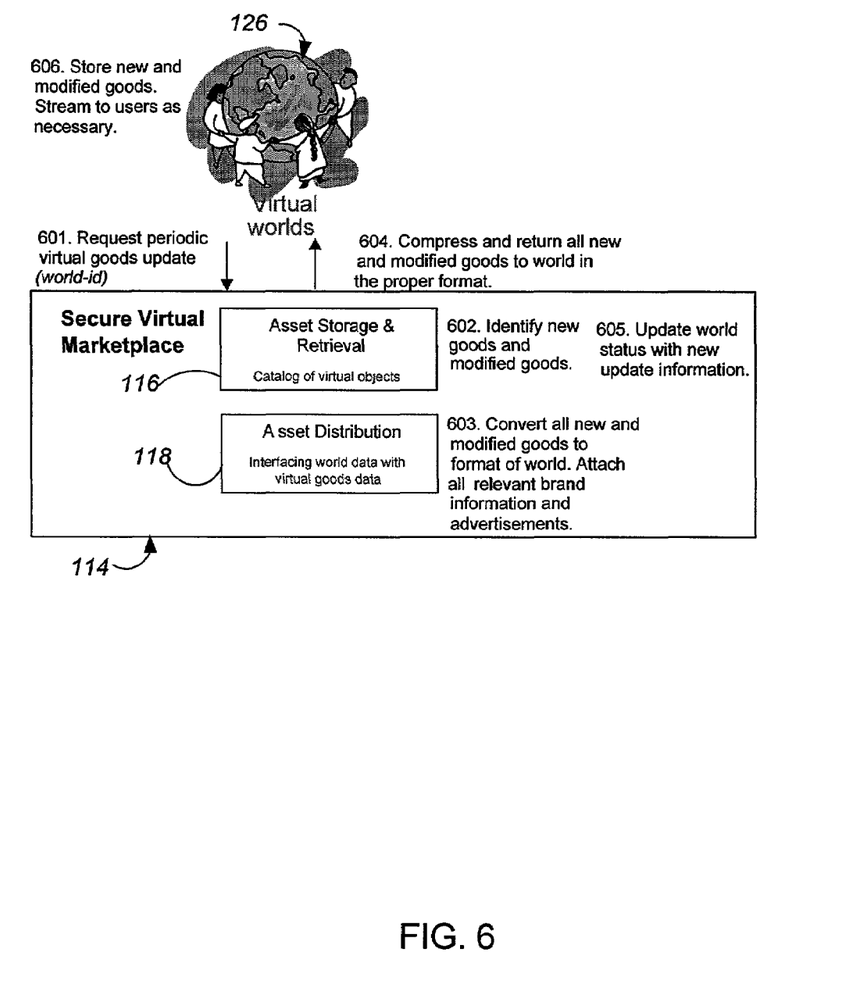
FIG. 6 shows a method for answering requests for ownership information of a virtual object in accordance with the invention.

An illustrative transaction flow of a periodic update operation is shown in FIG. 6. A virtual world server requests an update of its local virtual objects (step 601). Secure virtual marketplace 114 identifies new and modified virtual objects (step 602). Secure virtual marketplace 114 converts all the identified virtual objects to the data format of the requesting virtual world server and attaches relevant trademark, brand, and advertisement information to the new or modified virtual objects (step 603). Secure virtual marketplace 114 compresses and returns all new and modified virtual objects to the requesting virtual world (step 604) and updates its records to reflect that the requesting virtual world server has been updated (step 605). The virtual world server stores the new and modified virtual objects and streams them to users as needed (step 606).

The system 100 is not limited to attaching trademark or brand information to local virtual objects. Rather, the system 100 can attach such information to any virtual object in the virtual object list or the supply chain 102.

Verifying Ownership Information

Requests for ownership information is usually only made by the virtual world during user login. However, it is possible for dishonest users to hack into the various virtual object files such as those that have been distributed to their machines. This hacking allows them to show their avatars as having a particular virtual object even though they do not actually own the virtual object. This operation can be more easily achieved in a peer-to-peer or non-protected client-server virtual world architecture compared to a protected client-server architecture. In such cases, honest users can initiate an ownership request operation from within a virtual world to ascertain whether a given avatar is indeed the owner of any virtual objects of interest.

Note that ownership requests can also be made on an avatar alone, in which case, it will be assumed that the ownership request is made for all the virtual objects currently in the possession of the avatar of interest. Alternatively, an ownership verification request made on an avatar can, by default, specify all the virtual objects currently worn by the avatar.

Figure 7:
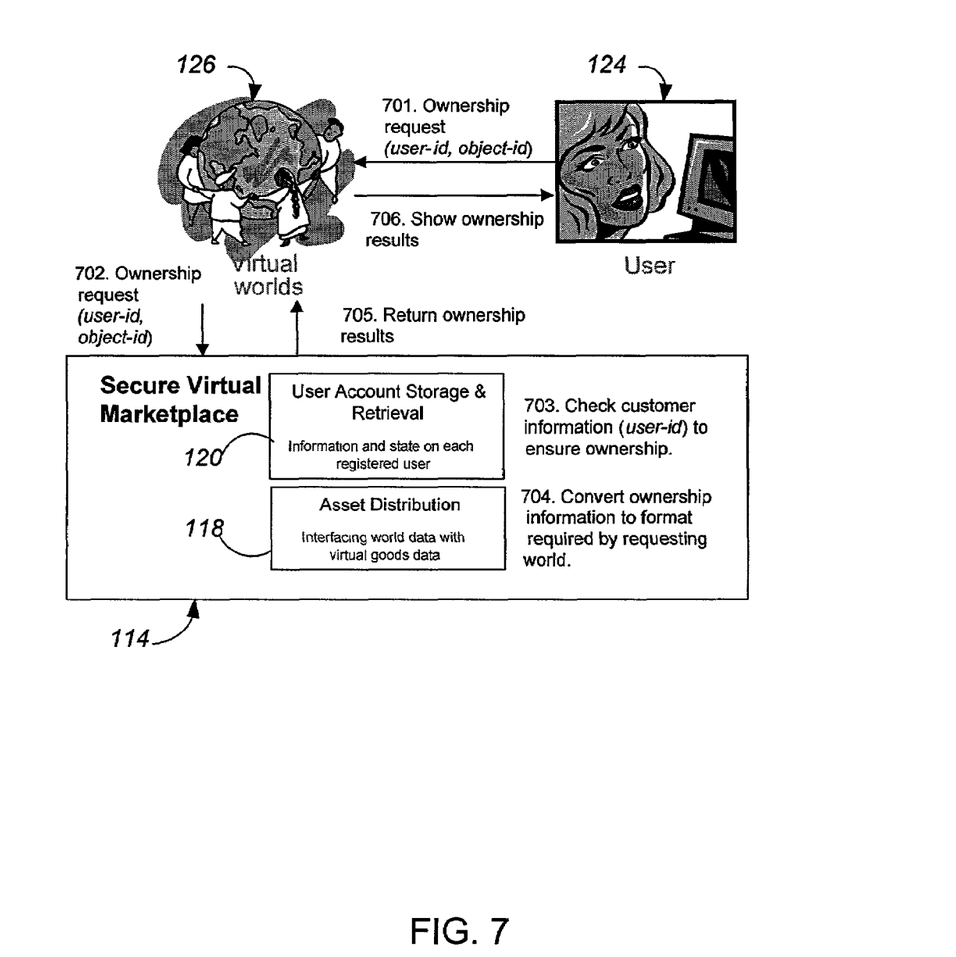
FIG. 7 shows a method for associating a real world object with a corresponding virtual object in accordance with the invention.

As shown in FIG. 7, user 124 sends an ownership request while logged in a virtual world (step 701). The request specifies the user and the virtual object of interest. The virtual world relays the request to system 100 (step 702), which then checks user and ownership information to verify that the avatar in possession of the virtual object in question is indeed the rightful owner of the virtual object (step 703). System 100 converts ownership information into a data format recognizable by the virtual world server (step 704). System 100 returns the verification results to the virtual world (step 705), which in turn conveys this information to the user 124 (step 706). Alternatively, in some situations such as when the user 124 is using a peer-to-peer connection, the system 100 returns the verification results to the user 124.

Associating Virtual Objects with Real World Objects

The value of real world objects can be enhanced by associating them to virtual objects. In addition to purchasing virtual objects, users may also obtain virtual objects from real world objects. This is achieved by attaching a unique identification ("ID"), such as a barcode, to the real world object. The IDs are also stored within secure virtual marketplace 114 and each ID is associated with a corresponding virtual object identification number. Upon obtaining the real world object, users may retrieve its associated virtual object by scanning the tag, for example with a barcode scanner.

Figure 8:
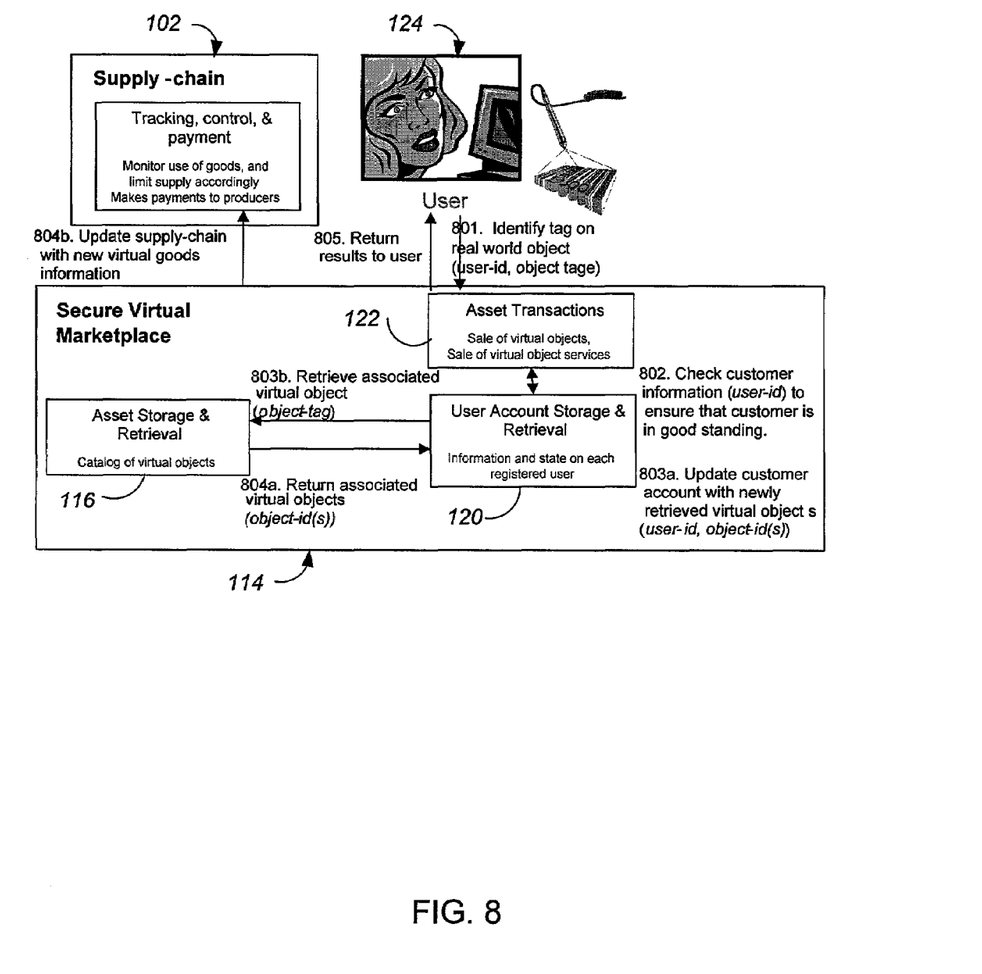
FIG. 8 shows a method for controlling the supply of virtual objects based on tracking and profiling information in accordance with the invention.

An example of this association operation is shown in FIG. 8. User 124 purchases a real world object (not shown) that has an ID, scans the ID, and sends the scanned information to secure virtual marketplace 114 (step 801). Secure virtual marketplace 114 checks the user's information to ensure that the user is in good standing (step 802). User Account Storage and Retrieval 120 updates the user's account with the newly received virtual object (step 830*a*) and retrieves the associated virtual object (step 803*b*). Asset and Storage Retrieval system 116 returns the associated object to the User Account Storage and Retrieval 120 (step 804*a*) and updates Supply Chain 102 with the new virtual object information to reflect the transaction (step 804*b*). Secure virtual marketplace 114 returns the results of the transaction to user 124 (step 805).

Note that conversion between real world objects and virtual objects can also occur in the opposite direction. For example, a user may choose to attach a real-world object to a virtual object. Having obtained a virtual object, users may then go to designated kiosks or counters, where they may then obtain their associated real world object upon providing their valid user id and password. Note also that system 100 also handles billing the companies who want to subscribe to this service. Billing of the companies, and the linking of real world tags to virtual objects are all achieved in supply chain 102.

Managing the Supply and Price of Virtual Objects

System 100 automatically controls the supply of various virtual objects based on specifications from their producers, as well as based on tracking and profiling information on the virtual objects themselves. Because a virtual objects resides in a digital medium, system 100 tracks their use, demand, and popularity with very high accuracy. Based on demand information, system 100 quickly responds by changing supply, changing price, or both, in order to yield the highest profits. Unlike conventional supply chain models where the production of goods usually lag their demand, system 100 has a supply chain model that can respond instantaneously to changes in demand. In addition, by authenticating purchases, and brand information, system 100 has secure control over the supply of virtual objects.

Establishing Virtual Objects as Dynamic Web Pages

In system 100, each and every virtual object (including an avatar, which is a special virtual object that can either be player controlled, or controlled by some artificial intelligence program) can be characterized as a dynamic Web page. This is because a virtual object, like a Web page, can present information in terms of visuals (pictures, video sequences), text, sound, and music. Just like a Web page, each virtual object can be identified as a unique entity within the space where it lives (i.e., each virtual object has a URL). Just like a web page, virtual objects can hyperlink to each other, as well as to traditional Web pages on the Internet.

Unlike dynamic Web pages, conventional Web pages are static in that they reside in a fixed location as identified by their URL. Virtual objects established as dynamic Web pages, however, are dynamic in that they may move to different locations based on user control or based on their independent movement programs. Unlike traditional Web pages which are flat, virtual objects may be flat, may have a three dimensional form, may consist purely of particles. Any form that may be expressed, either graphically, phonically, or otherwise, on a computer can be adopted by a virtual object as its form. In addition, because virtual objects can be dynamic, information may also be expressed through movement of the object itself. This form of information expression is not available in conventional systems.

Providing and Managing Services Associated with Virtual Objects

In addition to the purchase and sales of virtual objects, there is a surrounding set of services that may be performed upon such objects. System 100 provides the infrastructure for implementing such services, as well as for charging for them. The following describes three services that are provided for virtual objects in system 100.

Dynamic Advertising on Virtual Objects

System 100 allows virtual object producers to specify constraints on their goods that outline how and where advertisements may be presented. The owners of virtual objects can then specify additional constraints together with their willingness to incorporate advertising information within their virtual objects. Based on all these constraints, system 100 sets up a virtual objects advertising marketplace where it collects and presents all advertisement space that is available in the current virtual objects network. Companies may then bid on these available advertisement spots. Once a spot is purchased, the proper advertisements will be automatically integrated into the relevant virtual object and the virtual objects that are stored within the secure virtual marketplace will be updated with new information. This information will then be transmitted upon the next virtual world update as described in FIG. 6 and the corresponding text. Note that the advertisements need not be static, they can be dynamic. That is, the advertisements may present moving objects, pictures, and sound. In addition, an advertisement lasts for only the purchased period of time, after which another different advertisement will automatically replace it.

Insurance on Virtual Objects

Given that virtual objects are now being purchased with real dollars, it stands to reason that buyers may want to protect their goods against accidental loss or security leaks within the virtual worlds. System 100 allows users to purchase insurance on their purchased virtual objects. Upon the report of an item loss, or security leak, system 100 replaces the insured item with another. Note that to prevent insurance fraud, system 100 tracks all such reports and store the identification of the virtual objects that have been reported accidentally destroyed. If a good that has been reported as destroyed resurfaces at a later date, the related user accounts will be flagged as possible fraud cases.

Alteration Services on Virtual Objects

One of the key services that may be provided on virtual objects is one of enhancement and maintenance. Once sold, a virtual object can be enhanced by altering its appearance, sound, or movement. A virtual object can also be enhanced by adding new functionality. A virtual object may also need to be maintained based on updates that occur within the virtual worlds that they reside. System 100 provides the infrastructure for the secure trade of such services. Goods enhancement and maintenance companies can register with system 100 in order to have their available services displayed for purchase. Registered users of system 100 can then purchase such services using the secure transactions infrastructure that is already in place. Note that as in the dynamic advertising case, the type of enhancements and maintenance allowed can be constrained by the virtual object producer and such constraints will be stored within the specification of the good within secure virtual marketplace 114.

In summary, system 100 provides the following features. Management and procurement of virtual objects by consumers are simplified because once purchased such merchandise will be available across many different virtual environments.

The virtual object business is opened to a wide range of virtual object designers that until now have been uninterested in providing virtual objects because there was no secure channel with which to distribute their merchandise. Their participation will provide consumers with a larger range of virtual objects choices.

Consumers are shielded from fraudulent trades of virtual objects. Security for attaching trademarks and brands to virtual objects is provided so that mark and brand information will be securely authenticated upon login, as well as upon user request. This security helps control the illegal duplication of virtual objects and help encourage producers to participate in the sale of such goods.

The value of real world goods is enhanced by seamlessly attaching it to virtual objects and vice versa, the value of a virtual object is enhanced by attachment to a real world object. This allows companies to promote with virtual objects, which is much cheaper to produce, distribute and store compared to their real world counterparts.

Through trademark and brand security and virtual objects authentication services, a system in accordance with the invention can control the supply of virtual objects in closed-worlds.

Because virtual objects reside solely in the digital medium, their demand, use, and popularity can be tracked with very high accuracy. Based on the ability to control the supply of goods, as well as accurately track user demand information, a system in accordance with the invention can help producers set market price and market supply as well as automatically adjust these figures instantaneously to reflect changing market conditions. In this way, there will be no supply lag or glut, which commonly occurs in traditional supply chain models.

A network of hyper-linked dynamic virtual objects, the nucleus of the next generation Internet, is provided. This next generation Internet allows users to present information with a wider variety of graphical forms, sound, and most importantly with movement. Unlike the current Internet where information is statically kept at a location, the dynamic Web allows pages to move dynamically within a virtual world.

Secure trade and control of virtual objects services are provided. Assuming that there is demand for virtual objects, it is logical to also assume that there will be a demand for virtual objects services. Advertising on virtual objects, virtual objects insurance, and enhancements and maintenance of virtual objects will become crucial services. System 100 establishes a secure channel not only for the trading of goods, but also for the trading of services that are related to such goods.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. The system 100 is not limited to interactions with only virtual worlds but rather can interact with other virtual environments and corresponding virtual environment systems. For example, the system 100 can provide images for instant messaging systems. In this implementation, the system 100 can receive an object design that represents an avatar (which is a special virtual object). The system 100 can process this object design in the supply chain 102 as described. The system 100 can store, maintain, and distribute the resulting avatar from the secure virtual marketplace 114. A user purchases the image of the avatar. When the user uses the instant messaging system to send a message to a recipient, the system 100 distributes the avatar to the instant messaging system, which in turn displays to the recipient the avatar as a representation of the user. The system 100 can interact with all virtual environments and not only the exemplary ones described. For example, the system can be applied to virtual environments such as sports and parlor games. The system 100 can interact with any computing systems that displays images, including mobile devices such as a personal digital assistant or even a pager that includes a display. In these cases, the system 100 can send information representing virtual objects to the mobile devices, which then displays the virtual objects in accordance with the information received from the system 100.

What is claimed is:

1. A method for distributing virtual objects, comprising:
maintaining a list of virtual objects, each virtual object represented by data;
maintaining data format information for each of a plurality of virtual environment systems, the data format information for a virtual environment system specifying a format that data must have to be processable by the virtual environment system;
maintaining form information for virtual objects in the list of virtual objects, the form information for a virtual object specifying a form of the object for a given virtual environment system, wherein the form of a virtual objects depends on the virtual environment system with which the virtual object interacts;
receiving a request to distribute one or more virtual objects from the list of virtual objects, the request identifying the virtual objects to be distributed and the virtual environment system with which the virtual objects are to interact;
formatting, in accordance with the data format information and the request, data representing the one or more virtual objects to be distributed; and
distributing the one or more virtual objects.

2. The method of claim 1, further comprising:
maintaining ownership information for each virtual object in the list of virtual objects, the ownership information for a virtual object identifying a user who owns the virtual object;
receiving a request to trade one or more virtual objects between a first user and a second user, the trade request identifying the virtual objects to be traded and identifying the first and second users; and
modifying the ownership information for the one or more virtual objects to be traded to indicate ownership in accordance with the request to trade one or more virtual objects.

3. The method of claim 2, further comprising:
verifying that a trade as specified by the trade request is authorized, including verifying from the ownership information that the first and second users own the one or more virtual objects specified in the trade request.

4. The method of claim 1, further comprising:
maintaining ownership information for each virtual object in the list of virtual objects, the ownership information for a virtual object identifying a user who owns the virtual object; and
verifying that a distribution specified by the distribute request is authorized, including verifying that any distribution of the one or more virtual objects to be distributed is authorized by respective users who owns the one or more virtual objects.

5. The method of claim 1, further comprising:
maintaining charge accounts for users; and
charging the charge account for transactions requested by the users.

6. The method of claim 5, further comprising:
checking the status of a charge account of a user in response to a request; and
denying a request when the user has no charge account or when the user's charge account has insufficient funds.

7. The method of claim 1, wherein receiving a request to distribute one or more virtual objects includes receiving a request specifying an avatar to whom the one or more virtual objects are to be distributed, the avatar being controlled by a user who owns the one or more virtual objects, the method further comprising:
tracking the avatar's possession of virtual objects distributed, and
updating the ownership information to reflect any change of possession of the one or more virtual objects distributed.

8. The method of claim 7, wherein tracking includes:
taking an inventory of virtual objects distributed to the avatar before or when the avatar enters a virtual world generated by one of the plurality of virtual environment systems;
taking an inventory of virtual objects in the avatar's possession after or when the avatar exits the virtual world;

determining which virtual objects the avatar has gained or lost during the avatar's session in the virtual world; and updating the ownership information to reflect any changes in ownership of the virtual objects distributed.

9. The method of claim 8, further comprising:

placing any of the distributed virtual objects that were lost in a lost or destroyed list;

placing any of the distributed virtual objects that were gained in a gain list;

comparing the lost or destroyed list and the gain list; and designating as potential fraud any inconsistency between the lost or destroyed list and the gain list.

10. The method of claim 7, wherein tracking includes:

receiving updates of possession from a virtual environment system that is interacting with one or more virtual objects from the list of virtual objects, the updates reporting when a change of possession occurs and identifying who has possession; and updating the ownership information to reflect any changes in ownership of the virtual objects distributed.

11. The method of claim 1, further comprising:

maintaining a unique identifier for each virtual object in the list of virtual objects; and designating as potential fraud any virtual object that has a duplicate unique identifier.

12. The method of claim 1, further comprising:

receiving a request to attach a virtual object in the list of virtual objects to a function local to a virtual environment system;

verifying that the requested form can be attached to the function;

retrieving the function from the virtual environment system;

attaching the virtual object to the function; and distributing the virtual object.

13. The method of claim 1, further comprising:

maintaining a supply chain to provide a supply of virtual objects.

14. The method of claim 13, wherein number of virtual objects are finite in the supply chain and the list of virtual objects, the method further comprising:

tracking the usage of virtual objects in the list of virtual objects; and adjusting the supply of virtual objects in the database to increase profits.

15. The method of claim 13, wherein maintaining a supply chains includes:

receiving a virtual object design; and generating a virtual object from the virtual object design.

16. The method of claim 15, further comprising:

optionally associating meta-data with the virtual object generated.

17. The method of claim 16, wherein associating meta data includes:

adding any combination of brand and trademark information to an image of the virtual object.

18. The method of claim 13, wherein maintaining a supply chains further comprises:

classifying the virtual object and associating the classification with the virtual object.

19. The method of claim 1, further comprising:

receiving a request to verify ownership of a distributed virtual object, the request generated by a user controlling an avatar interacting inside a virtual world;

retrieving the ownership information of the distributed virtual object; and returning the ownership information.

20. The method of claim 19, wherein:

returning the ownership information includes sending the information to a virtual environment system that is generating the virtual world for presentation to the user from within the virtual world.

21. The method of claim 20, wherein associating includes:

maintaining a unique identification for each virtual object in the list of virtual objects, wherein the identification can be represented by a physical mark, including a bar code; and attaching the physical mark of one or more virtual objects in the list of virtual objects to a corresponding real world object.

22. The method of claim 19, wherein:

returning the ownership information includes sending the information to the user without sending such information to virtual world.

23. The method of claim 22, further comprising:

receiving a request to change ownership information of a virtual object associated with a real world object, the request including the unique identification scanned from the physical mark on the corresponding real world object and further including the identity of a user who is the new owner of the virtual object; and updating the ownership information to reflect the new ownership.

24. The method of claim 1, further comprising:

associating with virtual objects from the list of virtual objects any combination of brand and trademark information;

receiving a request to verify that a brand or trademark that appears on a virtual object is authentic, the request identifying the brand or trademark and the virtual object;

verifying that the brand or trademark identified in the request is associated with the virtual object identified in the request; and reporting whether the brand or trademark is authentic based on the verification.

25. The method of claim 1, further comprising:

associating a virtual object on the list of virtual objects with a real world object.

26. A virtual marketplace system, the system comprising:

a database configured to maintain a list of virtual objects and to maintain ownership information, wherein the owner ship information specifies an owner for each virtual object, the database being further configured to maintain data format information for virtual environment systems, the data format information for a virtual environment system specifying a data format recognizable by the virtual environment system; and a server configured for interaction with the database, with two or more virtual environment systems and with users, the interaction including receiving a trade request from a first user and a second user to trade virtual objects in the list of virtual objects, wherein the server is operable to access the database and verify that the first and second users are owners of their respective virtual objects, and further operable to change the ownership information in the database in accordance with the trade request, the interaction further including receiving a distribute request to distribute the exchanged virtual objects for interaction with a first of the two or more virtual environment systems, wherein the server is operable to retrieve the virtual objects and corresponding data format information from the data base, format the virtual objects in accordance with the data format information, and distribute the formatted virtual objects to the first virtual environment system.

27. The system of claim 26, wherein:

the database is configured to maintain form information for virtual objects in the list of virtual objects, the form information for a virtual object specifying a form of the object for a given virtual environment system, wherein the form of a virtual objects depends on the virtual environment system with which the virtual object interacts.

28. The system of claim 26, wherein:

the database is configured to maintain settlement information for at least one virtual object in the list of virtual objects, including entities who own rights to intellectual property associated with the at least one virtual object; and the server is configured to:

receive a request for a transaction involving the at least one virtual object;

perform the transaction in accordance with the request; and settle in accordance with the settlement information and the transaction.

29. The system of claim 26, wherein:

the database associates any combination of brand and trademark information with at least one virtual object in the list of virtual objects; and the server is operable to:

receive an authentication request to verify that a brand or trademark that appears on the at least one virtual object is authentic, the authentication request identifying the brand or trademark;

interact with the database to verify that the brand or trademark identified in the authentication request is associated with the at least one virtual object; and report whether the brand or trademark is authentic based on the verification.

30. A computer-program product, tangibly stored on machine-readable medium, for distributing virtual objects, the product comprising instructions operable to cause a processor to:

store a list of virtual objects, each virtual object being defined by data processable to generate the virtual object;

store data format information for each of a plurality of virtual environment systems, the data format information for a virtual environment system specifying a format that data defining a virtual object must have in order to be processable by the virtual environment system to generate the virtual object;

receive a request to distribute a first virtual object to a first virtual environment system, the request identifying the first virtual object and the first virtual environment system, the first virtual object being one of the virtual objects on the list of virtual objects, the first virtual environment system being one of the plurality of virtual environment systems, wherein data defining the first virtual object includes data defining a first form of the first virtual object and data defining a second form of the first virtual object, the first form being different from the second form;

select one of the forms of the first virtual object, the selection being based on which of the plurality of virtual environment systems was identified in the request to distribute the first virtual object;

format, in accordance with the data format information for the first virtual environment system, data defining the first virtual object; and send the formatted data to the first virtual environment system.

31. The product of claim 30, further comprising instructions to:

store ownership information for each virtual object on the list of virtual objects, the ownership information identifying a user who owns the virtual object;

receive a trade request to trade a second virtual object for a third virtual object, the request identifying the second virtual object, the third virtual object, a first user who owns the second virtual object, and a second user who owns the third virtual object; and modify the stored ownership information for the second and third virtual objects to indicate ownership in accordance with the request to trade the second and third virtual objects.

32. The product of claim 30, wherein the request to distribute the first virtual object specifies an avatar to whom the first virtual object is to be distributed, the avatar being controllable by a user who owns the first virtual object, the product further comprising instructions to:

store ownership information for the first virtual object, the ownership information identifying the user who owns the first virtual object;

track the avatar's possession of the first virtual object while the avatar is in a virtual environment generated by one of the plurality of virtual environment system; and update the stored ownership information to reflect a change in possession of the first virtual object.

33. The product of claim 32, wherein instructions to track include instructions to:

take inventory of virtual objects in the avatar possession before or when the avatar enters the virtual world generated by one of the plurality of virtual environment systems;

taking inventory of virtual objects in the avatar's possession after or when the avatar exits the virtual world; and determine which virtual object the avatar has gained or lost during the avatar's session in the virtual environment.

34. The product of claim 33, further comprising instructions to:

place a virtual object the avatar has lost on a lost or destroyed list;

place a virtual object the avatar has gained on a gain list;

compare the lost or destroyed list with the gain list; and designate as potential fraud any inconsistency between the lost or destroyed list and the gain list.

35. The product of claim 30, wherein data defining the first virtual object includes data defining a form of the first virtual object the product further comprising instructions to:

receive a request to attach the form of the first virtual object to a function that is local to the first virtual environment;

verifying that the form of the first virtual object can be attached to the function that is local to the first virtual environment;

retrieving the function from the first virtual environment; and attaching the form of the first virtual object to the function that is local to the first virtual environment system.

36. The product of claim 30, further comprising instructions to:
associate with the first virtual object any combination of brand and trademark information.

37. The product of claim 36, further comprising instructions to:
receive a request to verify that a brand or trademark that appears in the form of the first virtual object should appear in the form of the first virtual object;
verifying that the brand or trademark information is associated with the first virtual object; and
reporting that the brand or trademark that appears in the form of the first visual object should appear in the form of the first virtual object.

38. The product of claim 30, further comprising instructions to:
maintain digital right management information for the first virtual object.

39. The product of claim 30, wherein:
digital rights information includes one of information specifying that a particular brand or trademark can only be exclusively associated with the first virtual object, information specifying an owner of the brand or trademark information and the amount of royalties to be paid to the owner, or information specifying one or more usage restrictions for the brand or trademark.

* * * * *